(12) United States Patent
Bircann et al.

(10) Patent No.: US 6,497,226 B2
(45) Date of Patent: Dec. 24, 2002

(54) MODULAR, COMPLIANT, SEALING BEARING ASSEMBLY

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 13 days.

(21) Appl. No.: 09/778,609

(22) Filed: Feb. 7, 2001

(65) Prior Publication Data

US 2001/0032630 A1 Oct. 25, 2001

Related U.S. Application Data

(60) Provisional application No. 60/183,585, filed on Feb. 18, 2000.

(51) Int. Cl.[7] .......................... F02M 25/07; F16C 33/74; F16K 31/02; F16K 31/44; F02B 47/08
(52) U.S. Cl. .................. 123/568.11; 277/618; 277/390; 384/94; 123/188.6; 123/190.17; 123/568.21; 251/129.15; 251/214
(58) Field of Search ....................... 123/568.11, 568.22, 123/568.23, 568.24, 568.26, 90.37, 188.6, 190.17; 137/248; 251/88, 129.11, 129.15, 323, 330, 367, 369, 214; 277/618, 554, 557, 390; 384/94, 28, 416, 130, 607

(56) References Cited

U.S. PATENT DOCUMENTS

| | | | | |
|---|---|---|---|---|
| 3,991,974 A | * | 11/1976 | Bonafous | ..................... 251/306 |
| 5,784,922 A | * | 7/1998 | Ozaki et al. | ................ 74/424.8 |
| 5,988,891 A | * | 11/1999 | Yamamoto et al. | ......... 384/463 |

* cited by examiner

Primary Examiner—Gene Mancene
Assistant Examiner—Arnold Castro
(74) Attorney, Agent, or Firm—Patrick M. Griffin

(57) ABSTRACT

An improved modular, radially-compliant, redundantly-sealing journal-type bearing assembly comprising two bearing elements retained in a housing and positively loaded in opposing directions by a compression spring disposed therebetween. A shaft to be supported and sealed against leakage by the bearing, such as a valve pintle shaft, is disposed in an axial bore in each of the bearing elements, which bores are fitted as closely to the diameter of the shaft as is possible without causing the shaft to bind in the bores. Each of the radial bearing faces opposite the spring forms a seal with a corresponding internal surface of the housing, defining thereby a redundant sealing system. The bearings are radially compliant within the housing by a predetermined small distance to allow the shaft to be operatively self-centered, such as by an attached valve head mating into a valve seat. The improved bearing assembly may be pre-assembled offline to facilitate its incorporation into an apparatus, for example, a fuel cell valve, and may also be retrofitted into existing apparatus, for example, an exhaust gas recirculation valve.

10 Claims, 6 Drawing Sheets

MODULAR, COMPLIANT, SEALING BEARING ASSEMBLY

CROSS-REFERENCE TO RELATED APPLICATIONS

This application claims the benefit of U.S. Provisional Application, Ser. No. 60/183,585, filed Feb. 18, 2000.

TECHNICAL FIELD

The present invention relates to bearings for supporting a shaft in sliding and/or rotary motion; more particularly, to a journal bearing for supporting a reciprocable pintle in a pintle-type valve; and most particularly to a modular bearing assembly wherein two independent bearings are each radially compliant and also form redundant axial seals against leakage of a fluid, especially a gas, through the assembly.

BACKGROUND OF THE INVENTION

Linear and rotary actuators are commonly employed in various automotive, chemical, and general industrial applications for regulating gas flow and other similar functions. Many newer applications have very stringent requirements with respect to shaft leakage past a journal bearing. Some of these applications, such as fuel cells, are intolerant of any shaft leakage because the managed medium, such as hydrogen, is highly volatile and explosive. Control valves in such applications require substantially perfect axial alignment of the metering orifice and the valve shaft or pintle to close completely and reliably. Such alignment is difficult if not impossible to achieve in known control valves, especially in valves which must operate satisfactorily over a wide range of temperatures and pressures, with attendant thermally and torsionally induced dimensional changes in valve components.

The resultant misalignment inherent in known gas management valves not only makes it difficult to meet the valve leakage requirement but also diminishes valve performance by introducing significant parasitic frictional forces that are the direct result of component misalignment. To account for these frictional forces, actuators commonly are oversized, the result being devices which may be bulkier, heavier, and costlier than required for the gas management function alone. In automotive applications, for example, such oversized actuators can add to the weight of a vehicle, incurring permanent cost in reduced fuel efficiency and increased brake wear. Excess vehicle weight may increase to the point at which a given vehicle must be reclassified to a heavier, bigger class, incurring additional insurance cost and government imposed penalties.

What is needed is a modular assembly of a bearing which is readily pre-assembled offline, in which the bearing is radially compliant and may be self-aligned by the pintle, and in which the bearing also functions as a shaft seal.

SUMMARY OF THE INVENTION

The present invention is directed to an improved modular journal-type bearing assembly comprising two bearing elements retained in a housing and positively loaded in opposing axial directions by a compression spring disposed therebetween. An operative shaft to be both supported and sealed against leakage by the bearing, for example, a valve pintle shaft, is disposed in an axial bore in each of the bearing elements, the bores preferably being as closely fitted to the diameter of the shaft as is possible without causing the shaft to bind in the bores. Each of the radial bearing faces opposite the spring forms a seal with a corresponding radial surface of the housing, defining thereby a redundant sealing system. The bearings are free to move radially within the housing by a predetermined small distance to allow the shaft to be operatively self-centered, such as by an attached valve head mating into a valve seat. The improved bearing assembly may be pre-assembled offline to facilitate its incorporation into an apparatus, for example, a pintle valve, and may also be retrofitted into existing bearing installations.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
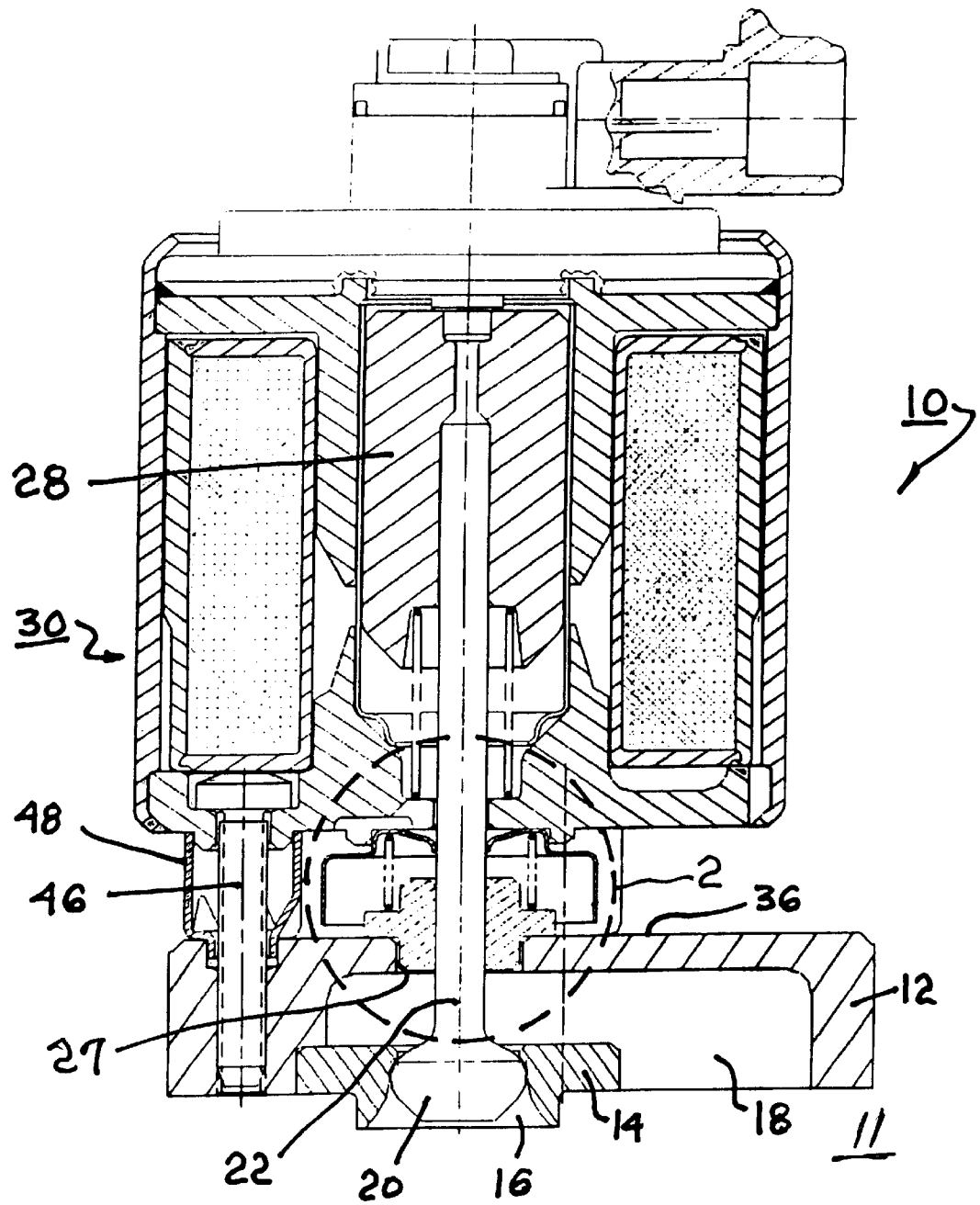
FIG. 1 is an elevational cross-sectional view of a pintle-type valve, showing a prior art bearing assembly.
Figure 2:
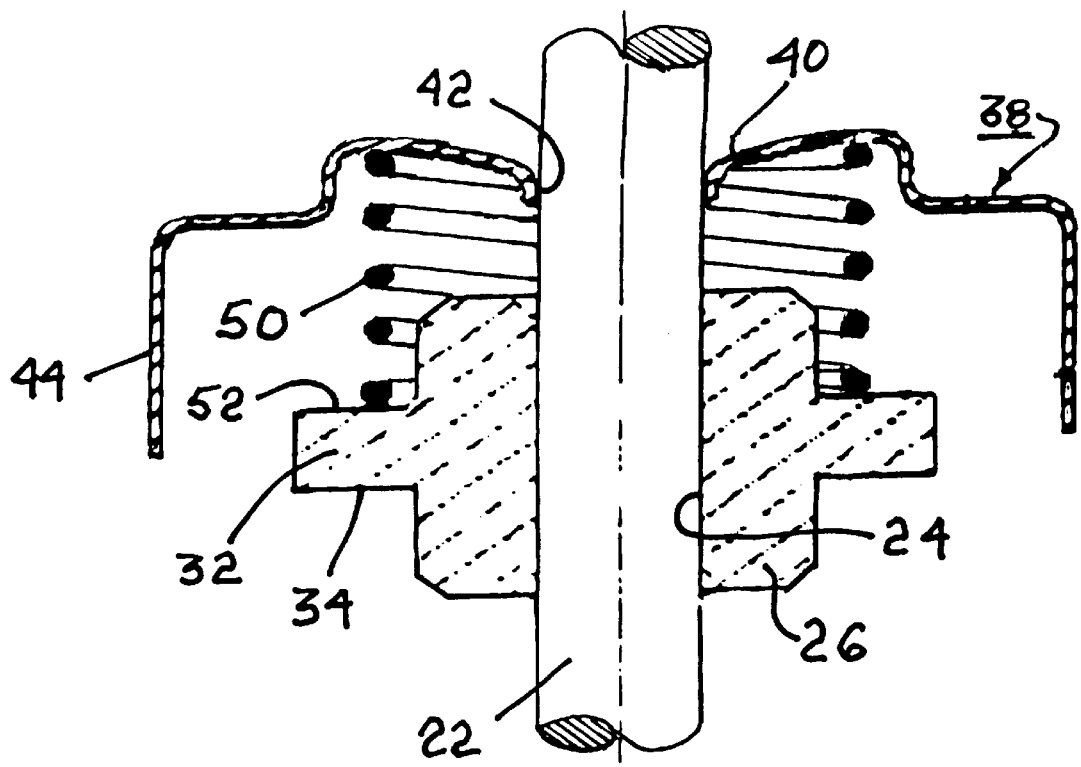
FIG. 2 is an enlarged and detailed view of area 2 in FIG. 1, showing a single bearing, bearing spring, and bearing splash shield.

The benefits afforded by the present invention will become more readily apparent by first considering a prior art bearing installed in a typical usage. Referring to FIGS. 1 and 2, a prior art EGR valve 10 includes a valve body 12 having a valve seat 14 separating a first chamber 16 from a second chamber 18, which chambers may communicate with the exhaust and intake systems, respectively, of an internal combustion engine (11) or the reverse. Valve head 20 is disposed adjacent to seat 14 for selectively mating therewith to open or to close communication between chambers 16 and 18. Valve stem, or pintle, 22 extends from head 20 through an axial bore 24 in bearing 26 and is captured within armature 28 of solenoid actuator 30. Bearing 26 is disposed in a port 27 in a wall of valve body 12 and guides stem 22 in reciprocating motion to open and close the valve when actuator 30 is energized and de-energized, respectively. Seat 14, head 20, pintle 22, and port 27 require a high degree of mutual concentricity for valve 10 to close completely and reliably. Bearing 26 is provided with a circumferential flange 32 having a first axial face 34 for sealing against axial outer surface 36 of valve body 12 to prevent leakage of gases therebetween. A cup-shaped bearing splash shield 38 has an inward-extending flange 40 with a central aperture 42 for passage of stem 22, preferably without contact therebetween, and a cylindrical skirt 44 extending axially to shield a substantial portion of bearing 26 from external contaminants. Shield 38 is open in a downwards direction to permit venting of any gases which may leak along bore 24 during operation of the valve. Actuator 30 is connected to valve body 12 via a plurality of bolts 46 extending through a plurality of standoffs 48. A coil spring 50 surrounding stem 22 is disposed within shield 38, being compressed between actuator 30 and a second surface 52 on flange 32 for urging flange 32 to seal against surface 36 under all operating conditions. Spring 50 also serves to urge shield 38 against actuator 30 to minimize dust intrusion into the actuator.

Referring to FIGS. 3–6, a first embodiment 54 of a modular bearing assembly for compliantly supporting and redundantly sealing a shaft includes first and second bearing elements 56,58 disposed coaxially within a generally cylindrical housing 60 formed preferably of first and second half-shells 60a,60b having equatorial flanges 61a,61b joined together as by welding, riveting, or any other equivalent means to form a closed housing. Being closed, housing 60 is superior to prior art splash shield 38 in protecting the bearings from outside contamination. Bearing elements 56,58 are preferably identical, and are treated as such in the following discussion, but, within the scope of the invention, may be different as required for a specific application. The bearing elements may be formed of any material appropriate to the expected use, for example, lubricated composite material or metal such as brass or bronze, or combinations thereof. Each of bearing elements 56,58 has an axial bore 62 for receiving a shaft 22 to be supported and sealed, for example, a valve pintle shaft. Preferably, the diameters of shaft 22 and bores 62 are as nearly identical as can be provided whilst still allowing the required sliding motion of the shaft in the bores to occur without binding. This important attribute allows nearly zero leakage to be obtained across a bearing in accordance with the invention.

Preferably, a guiding sleeve 64 is disposed within housing 60 for limiting the possible extent of radial movement of bearing elements 56,58 during compliance. The bearing elements are independent of each other, and radial compliance of the elements to any radial motion of the shaft 22 is provided and limited by a predetermined clearance 66 between the bearing outer diameter 68 and the sleeve inner diameter 70. Shaped washers 72 receive and guide a compression spring 74 disposed between bearing elements 56,58, provide a radial slip surface for inner bearing element radial faces 76, and limit the amount of axial displacement possible for the bearing elements. Each washer 72 is provided with a neck portion 78 having an axial bore 80 of diameter 81. Preferably, the outer diameter 82 of washer 72 is chosen in relation to sleeve diameter 70 and bore diameter 81 such that neck portion 78 cannot make contact with shaft 22 in any radial excursion of elements 56,58 or washer 72.

Housing half-shells 60a,60b are each provided with neck portions 84a,84b, the diametral clearance requirements to shaft 22 being substantially as just discussed for shaped washers 72.

Outer element radial faces 86 are conformable with inner housing radial faces 88 for forming mutual seals therewith. Faces 86 are urged against faces 88 by the compressed force of spring 74 to form first and second redundant seals 85,87, respectively. Spring 74 is selected to have a spring strength such that a seal force appropriate to the use is provided, whilst the bearing elements are not constrained from radially compliant motion as may be dictated by the shaft 22.

In operation, radial runout of shaft 22 during axial and/or rotational motion, as may be caused for example by misalignment of a valve seat, valve head, and valve pintle shaft, causes corresponding radial compliant motion of bearing elements 56,58 while sealing relationship of shaft 22 to element bores 62 is maintained. Further, sealing relationship of element faces 86 against housing faces 88 is also maintained.

Figure 3:
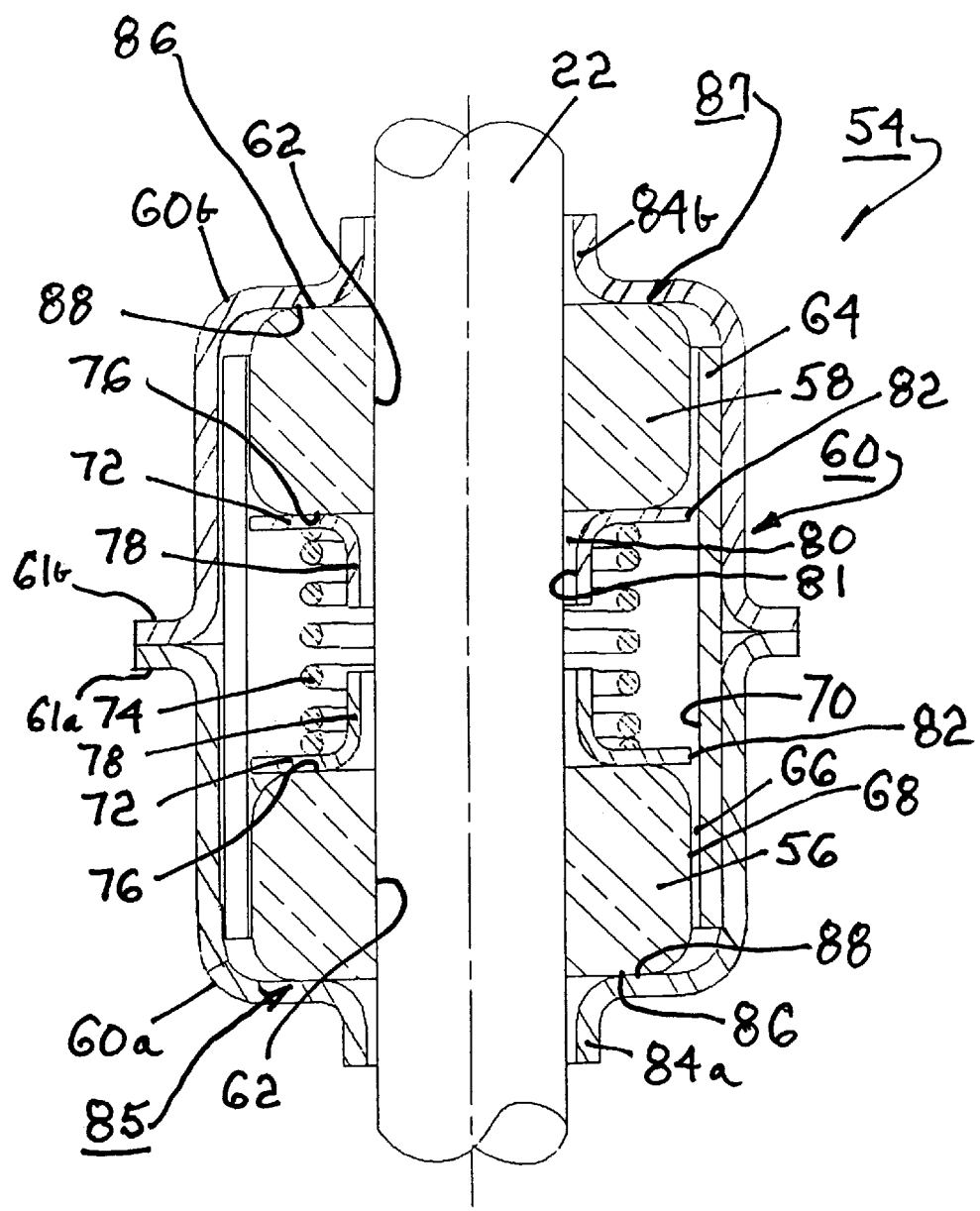
FIG. 3 is an elevational cross-sectional view of a first embodiment of a modular bearing assembly in accordance with the invention.
Figure 4:
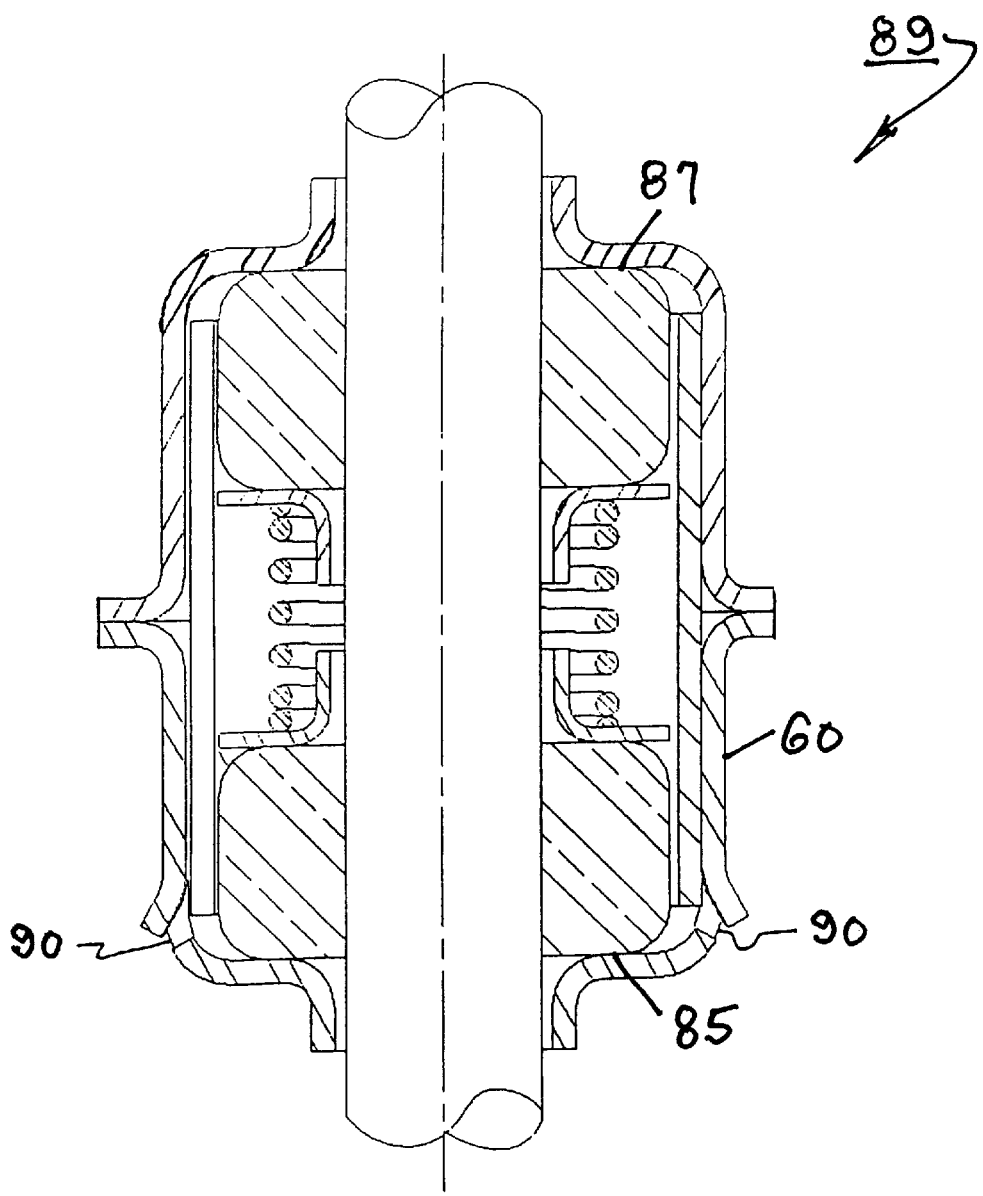
FIG. 4 is an elevational cross-sectional view like that shown in FIG. 3, showing venting provisions for a second embodiment of a modular bearing assembly.
Figure 5:
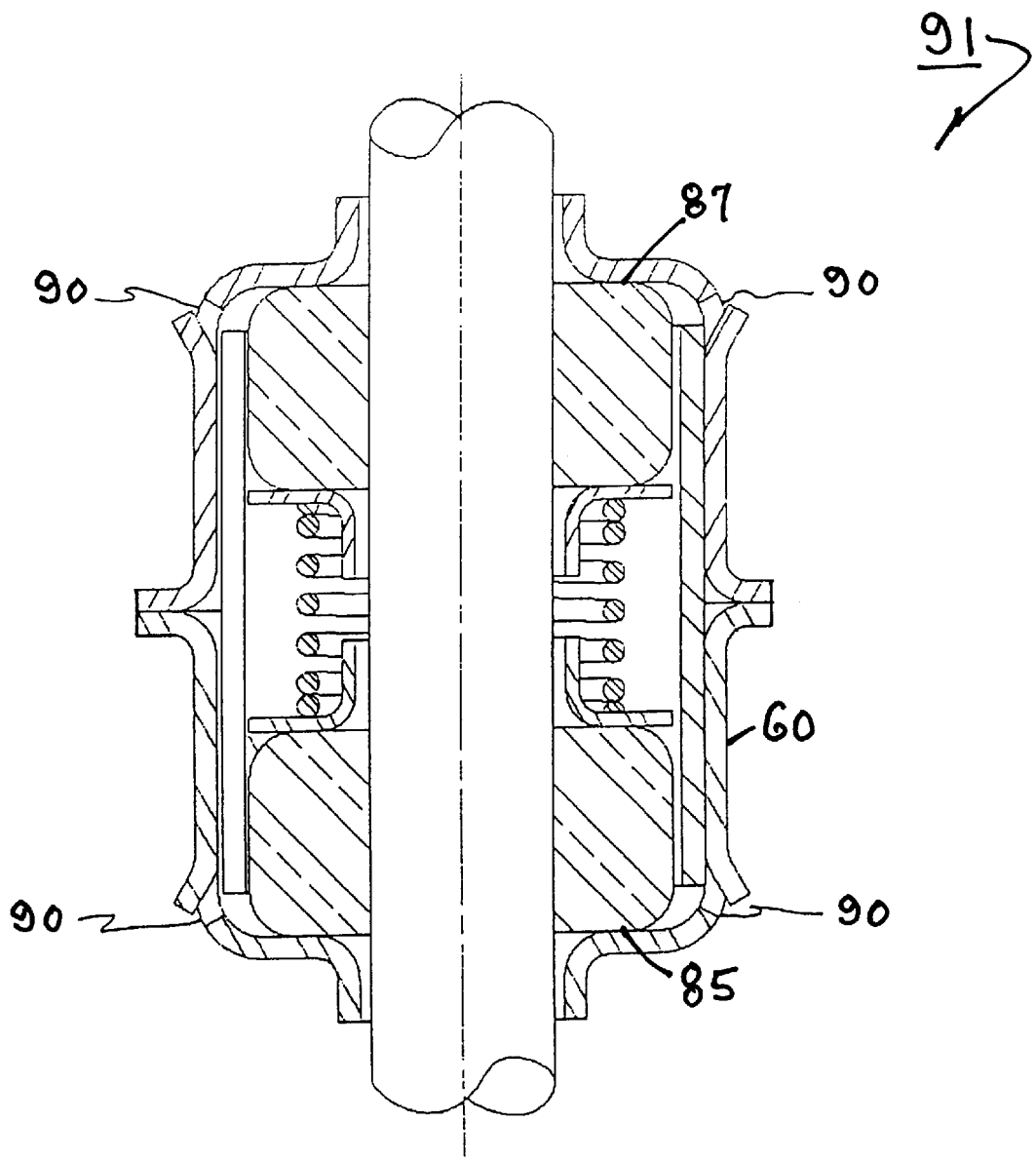
FIG. 5 is an elevational cross-sectional view like that shown in FIGS. 3 and 4, showing venting provisions for a third embodiment of a modular bearing assembly.

Embodiment 54 shown in FIG. 3 is appropriate where no communication is desired between the inside and the outside of housing 60, for example, in the management of hydrogen gas in a fuel cell. In other applications, however, venting of housing 60 may be desirable or necessary. For example, shaft leakage of exhaust gas from an exhaust gas recirculation valve on an internal combustion engine contains corrosive moisture which must be vented outside the housing to prevent its entrance into actuator 30. Accordingly, as shown in second and third embodiments 89 and 91 in FIGS. 4 and 5, one or more vent ports 90 may be formed as desired in the wall of housing 60 to provide such ventilation which reduces substantially to zero the pressure of leaked gas exerted against second seal 87.

Figure 6:
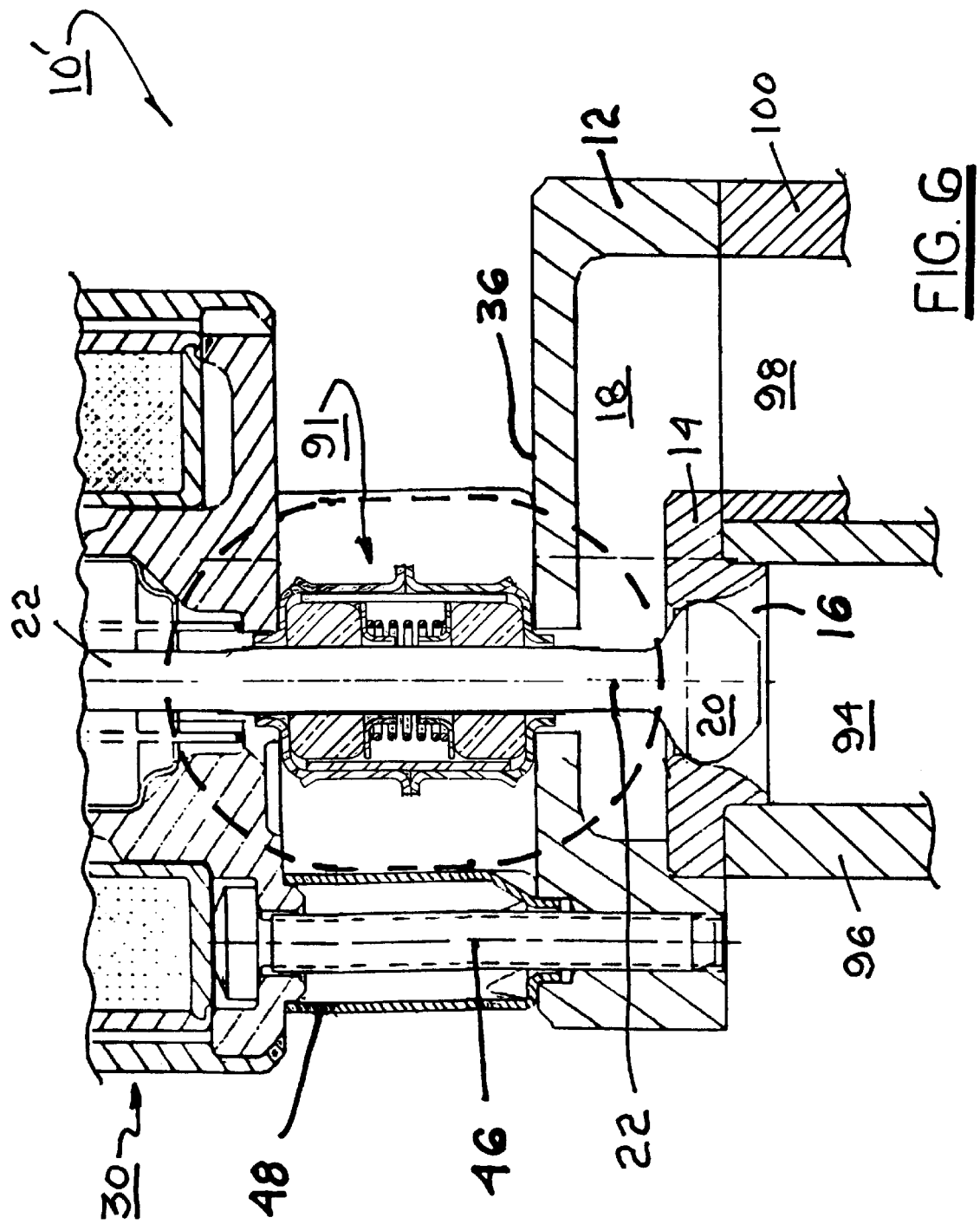
FIG. 6 is an elevational cross-sectional view of a modular bearing assembly in accordance with the invention installed in an exhaust gas recirculation (EGR) valve in an internal combustion engine.

In FIG. 6 is shown embodiment 91 incorporated into an exhaust gas recirculation valve 10' connected between a port 94 in the exhaust manifold 96 and a port 98 in the intake manifold 100 of an internal combustion engine.

The foregoing description of the preferred embodiment of the invention in a modular, radially-compliant, redundantly-sealing bearing assembly has been presented for the purpose of illustration and description. The description is not intended to be exhaustive nor is it intended to limit the invention to the precise forms disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A modular bearing assembly for supporting and redundantly sealing a movable shaft, comprising:

a) a housing having first and second axial bores for receiving said shaft and first and second internal radial sealing surfaces disposed adjacent to said first and second axial bores, respectively;

b) first and second bearing elements disposed coaxially within said housing and having first and second axial bores for receiving said shaft and first and second radial sealing surfaces for sealably mating with said first and second sealing surfaces, respectively, on said housing; and c) a coil spring disposed in compression between said first and second bearing elements for urging said sealing surfaces together to provide redundant first and second bearing seals.

2. A modular bearing assembly in accordance with claim 1 wherein said housing has an inside diameter and said bearing elements have an outside diameter, said housing inside diameter being greater than said bearing elements outside diameter, a first annular gap being defined therebetween to permit radial motion of said bearing elements within said housing in response to radial urging by said shaft.

3. A modular bearing assembly in accordance with claim 2 further comprising a guiding sleeve disposed in said housing between said housing and said bearing elements, said guiding sleeve having an inside diameter, wherein said inside diameter of said guiding sleeve is greater than said outside diameter of said bearing elements, a second annular gap being defined therebetween to permit radial motion of said bearing elements within said sleeve in response to radial urging by said shaft.

4. A modular bearing assembly in accordance with claim 1 further comprising at least one shaped washer disposed between said spring and one of said bearing elements.

5. A modular bearing assembly in accordance with claim 1 wherein said housing is sealed from outside environments.

6. A modular bearing assembly in accordance with claim 1 wherein said housing is provided with at least one vent port.

7. An exhaust gas recirculation valve for use in an internal combustion engine, said valve having a valve body and a valve pintle shaft extending from said valve body, said valve including a housing having first and second axial bores for receiving said shaft and first and second internal radial sealing surfaces disposed adjacent to said first and second axial bores, respectively; said valve further including first and second bearing elements disposed coaxially within said housing and having first and second axial bores for receiving said shaft and first and second radial sealing surfaces for sealably mating with said first and second sealing surfaces, respectively, on said housing; and said valve further including a coil spring disposed in compression between said first and second bearing elements for urging said sealing surfaces together to provide first and second bearing seals.

8. An internal combustion engine, comprising:
   a) an intake manifold having a first port therein;
   b) an exhaust manifold having a second port therein; and
   c) an exhaust gas recirculation valve connected between said first and second ports, said valve having a valve body and a valve pintle shaft extending from said valve body, said valve including a housing having first and second axial bores for receiving said shaft and first and second internal radial sealing surfaces disposed adjacent to said first and second axial bores, respectively; said valve further including first and second bearing elements disposed coaxially within said housing and having first and second axial bores for receiving said shaft and first and second radial sealing surfaces for sealably mating with said first and second sealing surfaces, respectively, on said housing; and said valve further including a coil spring disposed in compression between said first and second bearing elements for urging said sealing surfaces together to provide first and second bearing seals.

9. A modular bearing assembly for supporting and redundantly sealing a movable shaft, comprising:
   a housing having first and second axial bores for receiving said shaft and first and second internal radial sealing surfaces disposed adjacent to said first and second axial bores, respectively;
   first and second bearing elements disposed coaxially within said housing and having first and second axial bores for receiving said shaft and first and second radial sealing surfaces for sealably mating with said first and internal radial second sealing surfaces, respectively, on said housing;
   a coil spring disposed in compression between said first and second bearing elements for urging said sealing surfaces together to provide redundant first and second bearing seals;
   wherein said housing has an inside diameter and said bearing elements have an outside diameter, said housing inside diameter being greater than said bearing elements outside diameter, a first annular gap being defined therebetween to permit radial motion of said bearing elements within said housing in response to radial urging by said shaft; and
   a guiding sleeve disposed in said housing between said housing and said bearing elements, said guiding sleeve having an inside diameter, wherein said inside diameter of said guiding sleeve is greater than said outside diameter of said bearing elements, a second annular gap being defined therebetween to permit radial motion of said bearing elements within said sleeve in response to radial urging by said shaft.

10. A modular bearing assembly for supporting and redundantly sealing a movable shaft, comprising:
   a housing having a inner surface and first and second axial bores for receiving said shaft, said inner surface of said housing further comprising first and second internal radial sealing surfaces of said housing disposed adjacent to said first and second axial bores, respectively;
   first and second bearing elements disposed coaxially within said housing and having first and second axial bores for receiving said shaft and first and second radial sealing surfaces for sealably mating with said first and second internal radial sealing surfaces of said housing, respectively; and
   a coil spring disposed in compression between said first and second bearing elements for urging said first and second radial sealing surfaces of said bearings in abutting engagement with said first and second internal radial sealing surfaces of said housing to provide redundant first and second bearing seals.

* * * * *